United States Patent
Tisserand et al.

(10) Patent No.: US 8,841,889 B2
(45) Date of Patent: Sep. 23, 2014

(54) METHOD OF CONTROLLING THE REGULATION OF A MOTOR VEHICLE ALTERNATOR, AND CORRESPONDING DEVICES

(75) Inventors: Pierre Tisserand, Limeil Brevannes (FR); Pierre Chassard, Creteil (FR); Vincent Gendron, Saint Maur des Fosses (FR); Guillaume Duthilleul, Salles (FR)

(73) Assignee: Valeo Equipements Electriques Moteur, Creteil (FR)

(*) Notice: Subject to any disclaimer, the term of this patent is extended or adjusted under 35 U.S.C. 154(b) by 165 days.

(21) Appl. No.: 13/639,714

(22) PCT Filed: Apr. 6, 2011

(86) PCT No.: PCT/FR2011/050770
§ 371 (c)(1),
(2), (4) Date: Feb. 15, 2013

(87) PCT Pub. No.: WO2011/131888
PCT Pub. Date: Oct. 27, 2011

(65) Prior Publication Data
US 2013/0134950 A1 May 30, 2013

(30) Foreign Application Priority Data

Apr. 19, 2010 (FR) ..................................... 10 52965

(51) Int. Cl.
*H02H 7/06* (2006.01)
*H02P 11/00* (2006.01)
*H02P 9/00* (2006.01)

(52) U.S. Cl.
USPC ............................... 322/28; 322/44

(58) Field of Classification Search
CPC ............. H02P 9/48; H02P 9/02; H02J 7/1461
USPC ........ 322/28, 24, 20, 44, 89; 702/60; 700/286
See application file for complete search history.

(56) References Cited

U.S. PATENT DOCUMENTS

| 5,646,599 | A | 7/1997 | Adachi |
| 6,137,247 | A | 10/2000 | Maehara et al. |
| 6,894,402 | B2* | 5/2005 | Dubus et al. ................ 290/40 C |
| 2003/0042875 | A1 | 3/2003 | Okamoto et al. |
| 2006/0082347 | A1 | 4/2006 | Asada |
| 2006/0091864 | A1* | 5/2006 | Watanabe et al. ............... 322/28 |
| 2008/0088282 | A1 | 4/2008 | Inokuchi et al. |
| 2008/0306698 | A1* | 12/2008 | Pierret et al. .................... 702/60 |
| 2012/0032650 | A1* | 2/2012 | Chassard et al. ................ 322/44 |

* cited by examiner

*Primary Examiner* — Julio Gonzalez
(74) *Attorney, Agent, or Firm* — Berenato & White, LLC

(57) ABSTRACT

A method comprises the transmission to a regulator (8) of the alternator of width-modulated pulses (PWM1) exhibiting a duty ratio representative of a setpoint value (Vref) continuously included between a first reference duty ratio (DC1) and a second reference duty ratio (DC2), and the detection of these pulses by the regulator so as to generate the setpoint value. The method also comprises the transmission to the regulator of other width-modulated pulses (PWM2) exhibiting a specific duty ratio (EXOF_R) which is less than the first reference duty ratio (DC1) and ties between a low duty ratio (DCL) and a high duty ratio (DCH), and the detection of these other pulses by the regulator, in a first step, and the generation of an opening signal (EXOF) for a circuit for excitation of the alternator, in a second step, following this latter detection.

6 Claims, 3 Drawing Sheets

METHOD OF CONTROLLING THE REGULATION OF A MOTOR VEHICLE ALTERNATOR, AND CORRESPONDING DEVICES

CROSS-REFERENCE TO RELATED APPLICATIONS AND CLAIM TO PRIORITY

This application is a national stage application of International Application No. PCT/FR2011/050770 filed Apr. 6, 2011, which claims priority to French Patent Application No. 10/52965 filed Apr. 19, 2010, of which the disclosures are incorporated herein by reference and to which priority is claimed.

TECHNICAL FIELD OF THE INVENTION

The present invention relates to a method of controlling a device for regulating a motor vehicle alternator. The invention also relates to a regulating device and an engine control unit for putting this method into effect, and to the alternator comprising this regulating device.

TECHNOLOGICAL BACKGROUND OF THE INVENTION

In the automotive field it is well known to maintain the voltage supplied to the on-board electrical system by the vehicle alternator at a predetermined setpoint value, independently of the engine speed or the power consumption of the equipment, by means of a regulating device referred to as a "regulator".

Nowadays, automobile equipment manufacturers have developed high-performance alternators through the application of electronic power systems controlled by circuits using digital techniques, based for example on the use of microprocessors or microcontrollers.

Unlike the bi-metal regulators formerly used, which operated around a fixed regulation voltage independently of the operating conditions of the vehicle, modern electronic regulation devices take advantage of the processing capability of the electronics to receive variable setpoint values transmitted by an engine control unit so as to optimise the torque taken off in relation to the production of electrical energy required.

It can be appreciated that the alternator does not need to draw torque on starting the engine or during an acceleration in order to improve the performance of small-engined vehicles, or that the torque taken off can be reduced because the battery is already sufficiently charged.

In order to achieve this end by simple means, U.S. Pat. No. 5,767,636 describes a serial link for transmitting various commands to the regulator, in particular a command to stop the generation of power, as well as for transmitting discrete values of the duty ratio of the switching elements of the alternator excitation current corresponding to a discrete series of setpoint values.

However, given that a serial link is prone to reliability problems in the disturbed environment of the engine compartment, U.S. Pat. No. 6,137,247 filed by the same applicant proposes to replace it by a transmission with pulse width modulation (PWM).

The setpoint values of the regulator, comprised between 12 V and 15 V, are transmitted by pulses of predetermined period of which the duty ratio is between 10% and 90% for example.

To allow more precise control of the alternator, other operating parameters, in particular the excitation level, are transmitted also using pulses with variable duty ratios, but having periods different from those fixing the setpoint values.

Signals having duty ratios below 10% or above 90% % are not used as they are considered to be too sensitive to noise.

It is well known that a PWM transmission is a simple and robust alternative to serial transmission. However, the use of pulses of several different periods to increase the capacity of the channel appears to run counter to the initial objective of simplicity.

There thus remains a need for a simple PWM transmission making it possible to transmit both the setpoints of the regulator and other operating parameters of the alternator.

GENERAL DESCRIPTION OF THE INVENTION

The present invention therefore aims to meet this need.

Specifically, the object of the invention is a method for controlling a regulating device of a motor vehicle alternator.

In a known manner this regulator locks a DC voltage of an on-board electrical system powered by the alternator to a predetermined setpoint value by controlling an excitation circuit.

The disclosed method comprises:

in a first nominal operating mode of the alternator, the steps of:

transmitting to the regulating device by means of a communication line first width-modulated pulses having a predetermined period and a reference duty ratio representative of the setpoint value continuously comprised between a first reference duty ratio and a second reference duty ratio; and detecting the first pulses by the regulating device and generating the setpoint value, and in a second operating mode of the alternator without power generation, the steps of:

transmitting to the regulating device second width-modulated pulses having the same predetermined period and a specific duty ratio less than the first reference duty ratio and lying between a low duty ratio and a high duty ratio; and detecting the second pulses by the regulator in a first step and generating a signal for opening the alternator excitation circuit in a second step.

According to the invention, the method further comprises, in the said second operating mode without power generation, the steps of:

detecting an activity on the communication line before the first step;

if the communication line is active, computing the averages of the current duty ratios of a plurality of first or second pulses disregarding a predetermined number of first current duty ratios received, and comparing these averages to the low duty ratio and to the high duty ratio during the first step; and generating the opening signal during the second step if a second predetermined number of averages are comprised between the low duty ratio and the high duty ratio.

According to another particular feature of the invention, the opening signal is disabled if no activity is detected on the communication line or if none of the computed averages is comprised between the low duty ratio and the high duty ratio.

According to a further particular feature of the invention, the opening signal is preferably preponderant over a pre-excitation mode or over a phase regulation mode of the alternator.

According to a further particular feature of the invention, advantage is derived from the fact that the first and second pulses are preferably transmitted by an engine control unit so as to cause the starting or stopping of power generation alternatively to the master contact of the vehicle.

The invention also relates to a device for regulating a motor vehicle alternator designed to put into effect the method briefly described hereinabove.

The regulating device is of the type comprising:
means for locking a DC voltage of an on-board electrical system powered by the alternator to a predetermined setpoint value by controlling an excitation circuit;
first means for receiving via a communication input first width-modulated pulses having a predetermined period and a reference duty ratio representative of the setpoint value continuously comprised between a first reference duty ratio and a second reference duty ratio;
first means for detecting the first pulses and first means for generating the setpoint value;
second means for receiving via the communication input second width-modulated pulses having the same predetermined period and a specific duty ratio less than the first reference duty ratio and lying between a low duty ratio and a high duty ratio; and
second means for detecting the second pulses and second means for generating a signal for opening the excitation circuit of the alternator.

According to the invention, the regulating device additionally comprises third means for detecting activity on the communication input, and the second detecting means comprise means for evaluating and means for rejecting current duty ratios in a plurality of first or second pulses, means for computing averages of the current duty ratios and means for comparing these averages to the low duty ratio and to the high duty ratio.

The invention also relates to a motor vehicle alternator comprising the regulating device as described briefly above.

These few essential specifications will have made obvious to the person skilled in the art the advantages conferred by the method of controlling a regulating device according to the invention, as well as by the regulating device and the corresponding alternator, compared to the prior state of the art.

The detailed specifications of the invention are given in the following description in reference to the accompanying drawings. It will be noted that these drawings have no other purpose than to illustrate the text of the description and are in no way limitative of the scope of the invention.

BRIEF DESCRIPTION OF THE DRAWINGS

FIG. 3 is a timing diagram showing the sequence of operating modes of an alternator known in the prior art after the ignition is switched on.

DESCRIPTION OF PREFERRED
EMBODIMENTS OF THE INVENTION

Figure 1:
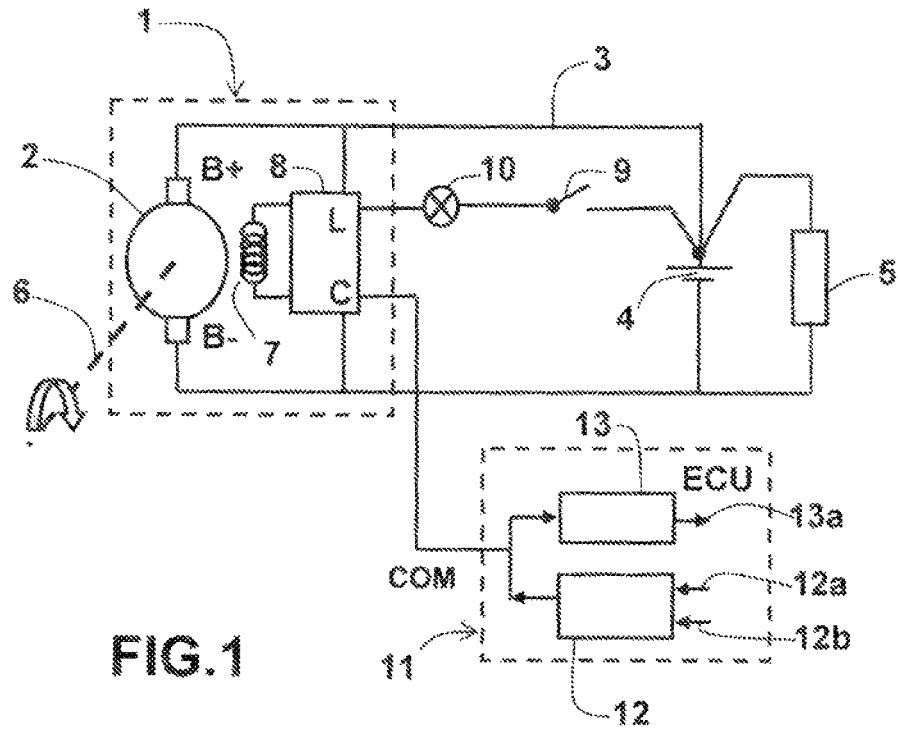
FIG. 1 is a block diagram of an alternator installation according to the invention on board a vehicle.

An alternator of the type disclosed by the invention, shown in FIG. 1, comprises:

a stator 2 of which the phase windings deliver, after rectification, a DC voltage B+, B− to the on-board electrical system 3 to recharge a battery 4 and to feed various electrical loads 5,
a rotor 6 mechanically coupled to the combustion engine of the vehicle;
an excitation circuit 7 in the form of an excitation coil included in the rotor and controlled by a regulating device 8 for setting the DC voltage B+, B− to a setpoint value Vref.

The regulating device 8 is generally switched on when the master contact 9 of the vehicle is closed at the driver's initiative (often immediately followed by starting of the combustion engine by a starter).

Normal operation of the alternator 1 is signalled to the driver by an indicator 10 connected to the on/off terminal L of the regulator 8.

In most regulators 8 of alternators 1 fitted in vehicles, especially in vehicles that do not require sophisticated electronic control, the setpoint value Vref is fixed.

This fixed setpoint value V0 is generally slightly higher than 14 V so as to efficiently charge a lead-acid battery 4.

When the battery is charged, it is not necessary for the voltage B+, B− of the on-board electrical system 3 to be maintained at this level, and there is therefore no need to draw the corresponding torque from the combustion engine.

In more complex regulating devices 8 for alternators 1 fitted in higher-specification vehicles, the setpoint values Vref are variable depending on the state of charge of the battery 4, the electrical loads 5 connected to the on-board electrical system 3, or the operating phases (starting, idling, acceleration, deceleration, stalling) of the engine.

These setpoint values Vref are generally transmitted by an engine control unit 11 over a communication line COM to a specific terminal C of the regulator 8 by specific transmission means 12, 12a.

In a reciprocal manner, these advanced regulators 8 transmit over the same communication line COM status information received by specific receiving means 13, 13a of the engine control unit 11 addressed to other systems in the vehicle and to the driver.

Transmission of the setpoint values Vref is most often accomplished by pulse width modulation, which is preferred over other types of connection, such as a serial link, for its simplicity and better noise immunity.

Customarily the setpoint values Vref are comprised between 11.5 V and 155 V, corresponding to duty ratios between 0% and 100%.

Figure 2:
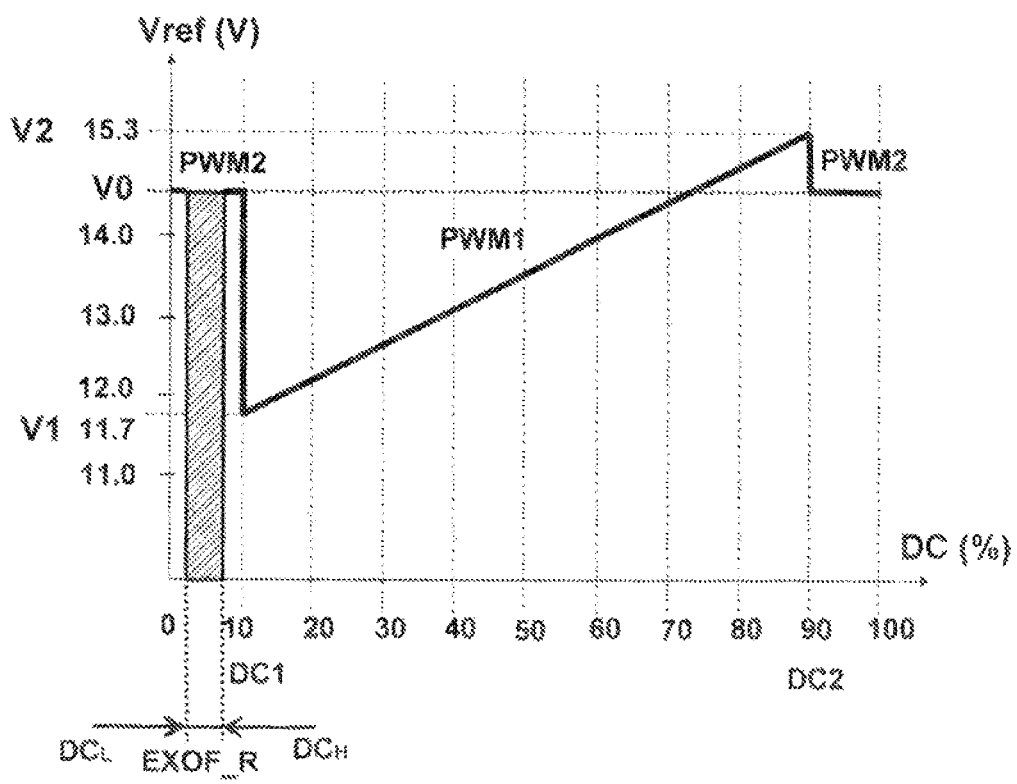
FIG. 2 is a diagram showing the encoding of the setpoint value of the regulating device shown in FIG. 1 and a command for opening an excitation circuit by pulse width modulation according to the invention.

However, experience shows that low duty ratios PWM2 below a first threshold DC1 in the order of 10%, or conversely high duty ratios PWM2 above a second threshold DC2 in the order of 90%, in addition to being difficult to detect in a reliable manner, are of little use in that they correspond to voltage values that are too low or too high. They are generally not used in a first nominal operating mode of the generator 1 to assign a variable setpoint value Vref, but to force a fixed setpoint value V0, as shown in FIG. 2.

As a result, in existing regulating devices, the duty ratios PWM1 comprised between the first and second thresholds DC1, DC2 only make it possible to assign setpoint values Vref between a low value V1 and a high value V2, for example, in the order of 11.7 V and 15.3 V, respectively, in this embodiment.

The duty ratios below the first threshold DC1, which are unused in existing regulators, could enable the engine control unit 11 to transmit additional information, or commands, provided that the regulating device 8 is able to detect in this range, in a reliable manner, specific duty ratios EXOF_R representative of such information or such commands.

A command that would be of great importance when starting the engine, or during an acceleration, is a command to stop the power generation of the alternator 1 to avoid unnecessary take-off of torque.

Figure 3:
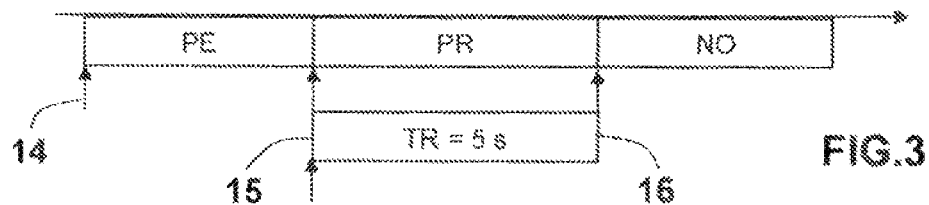
Figure 4A:
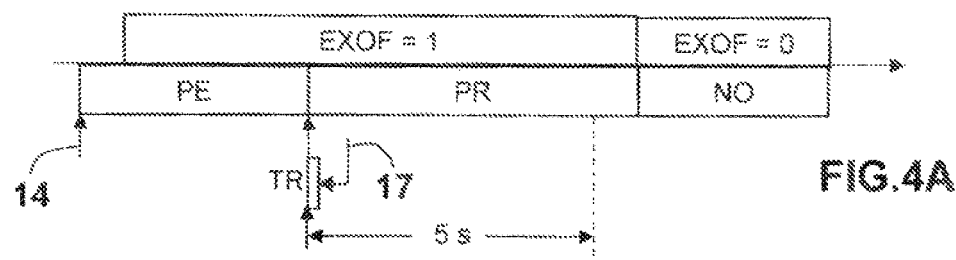
FIGS. 4a, 4b, 4c and 4d are timing diagrams showing the sequence of operating modes of an alternator comprising a mode without power generation according to the invention.
Figure 4B:
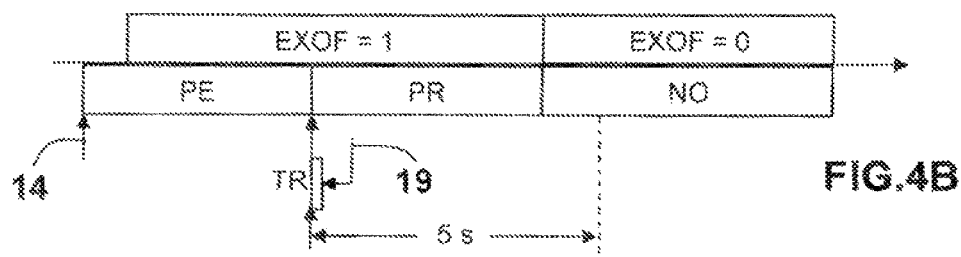
Figure 4C:
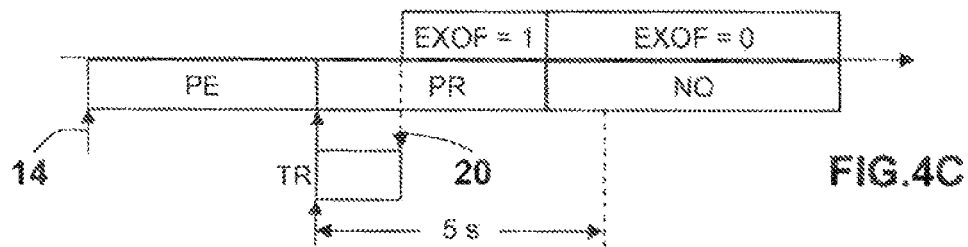
Figure 4D:
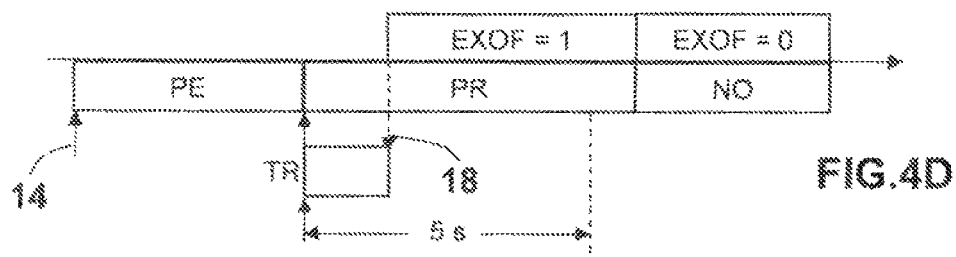

FIG. 3 shows the successive operating modes of a conventional alternator from turning on the ignition 14:
- a pre-excitation mode PE during which the so-called magnetization excitation is applied until the combustion engine has reached a predetermined speed threshold;
- a pre-regulation mode PR, or phase regulation mode, triggered when the engine speed exceeds this speed threshold, for a predetermined time TR, preferably in the order of 5 seconds, and during which only light excitation is applied to maintain a predetermined phase level;
- a nominal operating mode of the alternator NO, at the end 16 of the time delay TR, during which the alternator delivers regulated power.

Given the immediate perception by the driver of a start or an acceleration, the response to the command to stop the generation of power must be rapid and similar to the action of the ignition key 9.

The method of controlling a regulating device 8 of a new generation alternator 1 according to the invention, which will be described in detail in reference to FIG. 5, makes it possible to reliably and rapidly detect the transmission of such a command by the engine control unit 11.

In the alternator 1 according to the invention the generation of power is stopped by the opening of the excitation circuit 7 in response to an opening signal EXOF (the expression "opening of the excitation circuit" means "opening of the excitation power circuit", but a small current can flow through the excitation coil 7 to allow phase regulation).

The opening signal EXOF is preponderant over all operating modes of the alternator 1, as shown schematically in FIGS. 4a, 4b, 4c and 4d:
- the pre-regulation mode PR is prolonged for the whole duration where the opening signal of the excitation circuit EXOF is valid (EXOF=1) (FIGS. 4a, 4d), by inhibiting 17 or stopping 18 the counter generating the time delay TR;
- the nominal operating mode NO of the alternator 1 is forced when the opening signal of the excitation circuit EXOF is invalid (EXOF=0), even if the pre-regulation mode PR is in progress (FIGS. 4b, 4c), by inhibiting 19 or stopping 20 the counter.

According to the invention, the command to stop the generation of power is transmitted by the engine control unit 11 using a range of duty ratios EXOF_R not used for the transmission of the setpoint values Vref of the regulator 8. This range of duty ratios EXOF_R can for example be situated at the top or bottom of the range of duty ratios used. In the embodiment described here, the range EXOF_R used is situated in the lower part of the range.

This range EXOF_R is comprised between a low duty ratio DCL and a high duty ratio DCH, both of which are less than a first reference duty ratio DC1 preferably corresponding to the low threshold of standard regulators, that is to say in the order 10%, as shown in FIG. 2.

Figure 5:
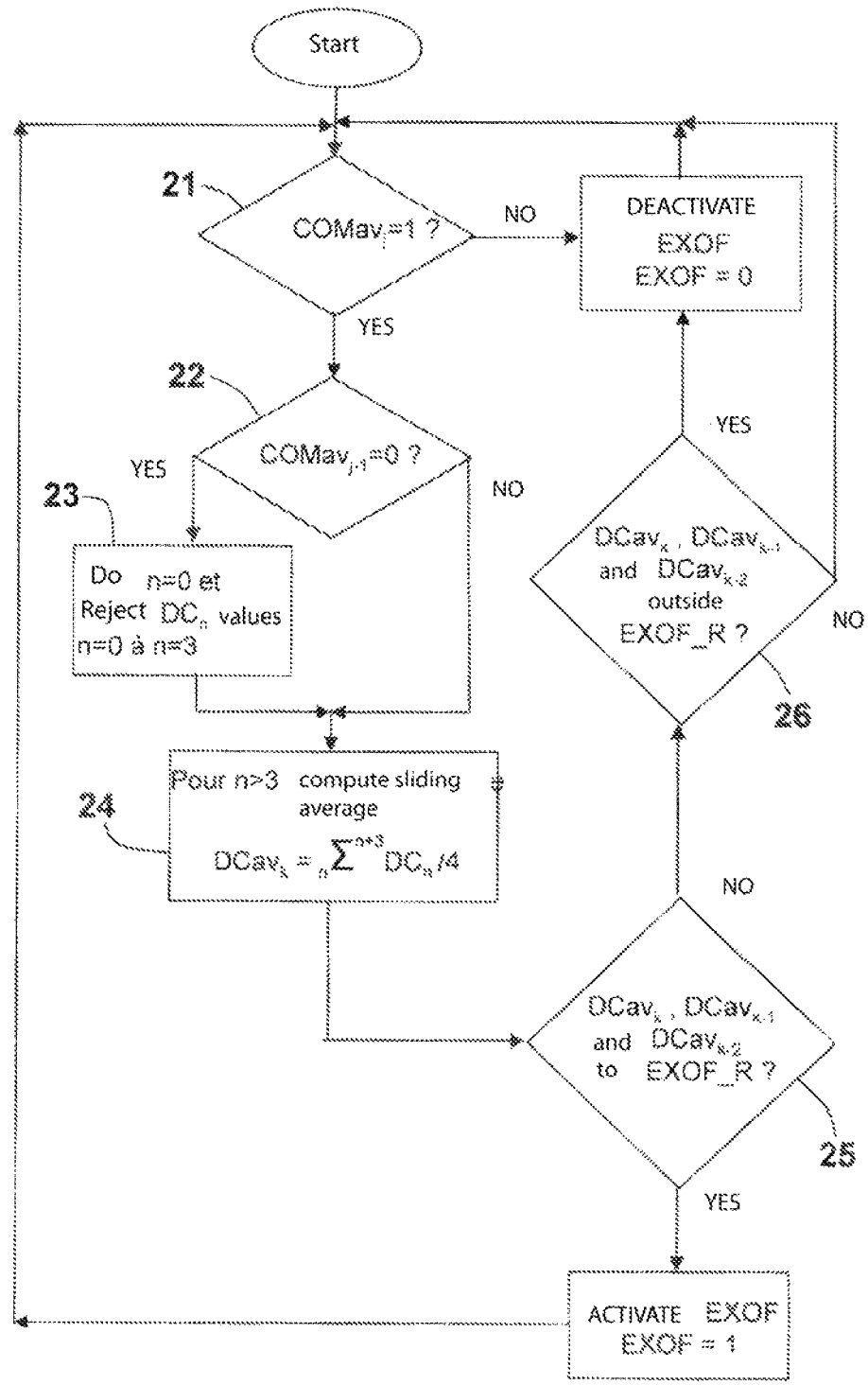
FIG. 5 is a diagram showing the decoding of a command for opening an excitation circuit transmitted by a pulse width modulation according to the invention.

According to the method of the invention, the reliability of the transmission is obtained in particular by periodically executing in the regulating device 8 the algorithm shown in FIG. 5.

A first wait loop 21 keeps the signal for opening the excitation circuit EXOF deactivated (EXOF=0) as long as no activity is detected (COMaV$_j$=0) to the communication input C of the regulator 8.

When activity is detected (COMaV$_j$=1), such as rising pulse edges or frequencies, a rejection loop 22, 23 evaluates the current duty ratios DC$_n$ of the received pulses and determines 22 whether they are first received (COMaV$_{j-1}$=0). In this case, a first predetermined number, preferably 4, of the current duty ratios DC$_0$, DC$_1$, DC$_2$, DC$_3$ are rejected 23 as they are considered the most susceptible to uncertainties in establishing the communication.

The next current duty ratios DC$_n$ are considered valid and are used to compute 24 an average DCav$_k$ for example in a sliding window, covering for example 4 successive current duty ratios DC$_n$:

$$DCav_k = \sum_n^{n+3} DC_n / 4$$

Of course, other averaging algorithms can be used depending on the applications of the invention.

A second predetermined number of these sliding averages DCav$_k$, DCav$_{k-1}$, DCav$_{k-2}$, preferably 3, are compared in a second wait loop 25 with the low duty ratio DCL and with the high duty ratio DCH. In the case where all of these averages DCav$_k$, DCav$_{k-1}$, DCav$_{k-2}$ are simultaneously in the range EXOF_R encoding the transmission of the operating command without power generation, the opening signal of the excitation circuit is validated EXOF (EXOF=1).

If this is not the case, a third delay loop 26 determines whether all of the averages DCav$_k$, DCav$_{k-1}$, DCav$_{k-2}$ are simultaneously out of the range EXOF_R. In this case, the signal for opening the excitation circuit EXOF is disabled (EXOF=0).

The filtering algorithm described hereinabove and shown in FIG. 5 makes it possible to reliably use duty ratios DC$_n$ of low values, below 10%, which were regarded in the prior art as being too susceptible to noise.

This algorithm is for example implemented by the program in digital computing and processing blocks composed of microprocessors or microcontrollers or by dedicated circuits or micro-wired logic modules that can be extended to FPGA type gate arrays.

In the preferred embodiments of the invention, the microcode of an engine control unit is also advantageously upgraded to implement the method of the invention and to transmit to the regulating device 8 a command for operation without power generation of the alternator 1 using the communication line COM by means of customary width-modulated pulses.

Alternatively, the method of the invention can be implemented in the specific transmission means 12, 12b of an engine control unit 11 by any other means considered equivalent by the person skilled in the art. It goes without saying that the invention is therefore not limited solely to the preferred embodiments described hereinabove.

In particular, the first predetermined number of duty ratios rejected at the beginning of the transmission given as 4, the second predetermined number of sliding averages needed to validate the signal for opening the excitation circuit EXOF given as 3, and the range of these sliding averages fixed at 4, are given only by way of example. The choice of any other numerical values would simply constitute alternative embodiments, even though they may no longer be optimal.

These other embodiments do not extend beyond the scope of the present invention in that they derive from the claims hereinbelow.

The invention claimed is:

1. A method of controlling a regulating device (8) of a motor vehicle alternator (1) locking a DC voltage (B+, B−) of an on-board electrical system (3) powered by said alternator (1) to a predetermined setpoint value (Vref) by controlling an excitation circuit (7), said method in a first nominal operating mode of said alternator (1), comprising the steps of:
   transmitting to said regulating device (8) by means of a communication line (COM) first width-modulated pulses having a predetermined period and a reference duty ratio (PWM1) representative of said setpoint value (Vref) continuously comprised between a first reference duty ratio (DC1) and a second reference duty ratio (DC2); and
   detecting said first pulses by said regulating device (8) and generating said setpoint value (Vref); and
      in a second operating mode of said alternator (1) without power generation, comprising the steps of:
   transmitting to said regulating device (8) second width-modulated pulses having said predetermined period and a specific duty ratio (EXOF_R) less than the first reference duty ratio (DC1) and lying between a low duty ratio (DCL) and a high duty ratio (DCH);
   detecting said second pulses by the regulating device (8) in a first step (22, 23, 24) and generating a signal (EXOF) for opening the alternator excitation circuit (7) in a second step (25); wherein in the second operating mode without power generation, said method also comprises the steps of:
   detecting (21) an activity on the communication line (COM) before said first step (22, 23, 24);
   if said communication line (COM) is active, computing (24) averages (DCavk) of current duty ratios (DCn) in a plurality of said first or second pulses disregarding (23) a first predetermined number of first said current duty ratios (DC0, DC1, DC2, DC3) received, and comparing said averages (DCavk) to said low duty ratio (DCL) and high duty ratio (DCH) during said first step (22, 23, 24); and
   generating said opening signal (EXOF) during said second step (25) if a second predetermined number of said averages (DCavk, DCavk-1, DCavk-2) are comprised between said low duty ratio (DCL) and said high duty ratio (DCH).

2. A method of controlling a regulating device (8) of a motor vehicle alternator (1) according to claim 1, characterised in that said opening signal (EXOF) is deactivated if no activity is detected (21) on said communication line (COM) or if none of said averages (DCavk) is comprised (26) between said low duty ratio (DCL) and said high duty ratio (DCH).

3. A method of controlling a regulating device (8) of a motor vehicle alternator (1) according to claim 1, characterised in that said opening signal (EXOF) is preponderant over a pre-excitation mode (PE) or over a phase regulation mode (PR) of the said alternator (1).

4. A method of controlling a regulating device (8) of a motor vehicle alternator (1) according to claim 1, characterised in that said first and second pulses are transmitted by an engine control unit (11) to cause the starting or stopping of a power generation by said alternator (I) alternatively to the master contact (9) of said vehicle.

5. A regulating device (8) of a motor vehicle alternator (1) designed to put into effect the method according to claim 1, of the type comprising:
   means for locking a DC voltage (B+, B−) of an on-board electrical system (3) powered by said alternator (1) to a predetermined setpoint value (Vref) by controlling an excitation circuit (7);
   first means for receiving via a communication input (C) first width-modulated pulses having a predetermined period and a reference duty ratio (PWM1) representative of the setpoint value (Vref) continuously comprised between a first reference duty ratio (DC1) and a second reference duty ratio (DC2);
   first means for detecting said first pulses and first means for generating said setpoint value (Vref);
   second means for receiving via said communication input (C) second width-modulated pulses having said predetermined period and a specific duty ratio (EXOF_R) less than said first reference duty ratio (DC1) and lying between a low duty ratio (DCL) and a high duty ratio (DCH);
   second means for detecting said second pulses and second means for generating a signal (EXOF) for opening said excitation circuit (7); further comprising third means for detecting activity on said communication input (C), and wherein said second detection means comprise means for evaluating current duty ratios (DCn) in a plurality of said first or seconds pulses, means for rejecting said current duty ratios (DC0, DC1, DC2, DC3), means for computing averages (DCavk) of said current duty ratios (DCn) and means for comparing said averages (DCavk, DCavk-1, DCavk-2) with said low duty ratio (DCL) and high duty ratio (DCH).

6. A motor vehicle alternator (1) comprising a regulating device (8) according to claim 5.

* * * * *